No. 742,462. PATENTED OCT. 27, 1903.
J. W. LIVERMORE.
TRACTION WHEEL.
APPLICATION FILED NOV. 25, 1902.
NO MODEL.
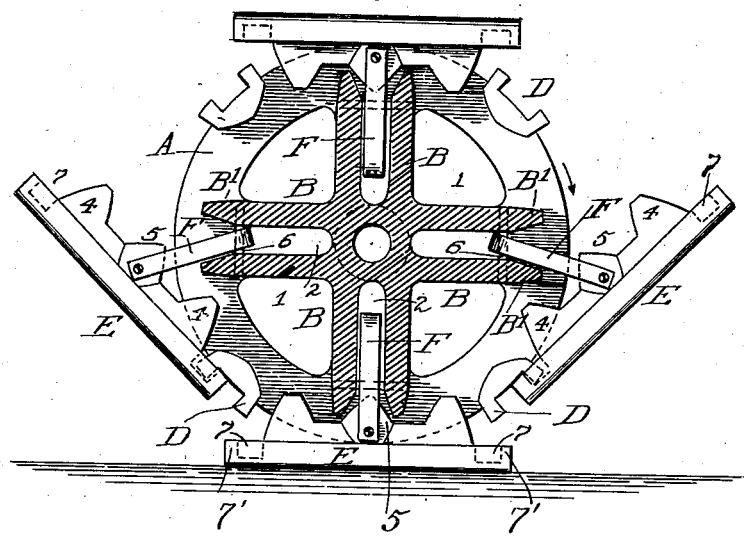
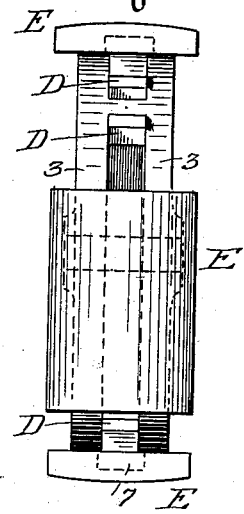
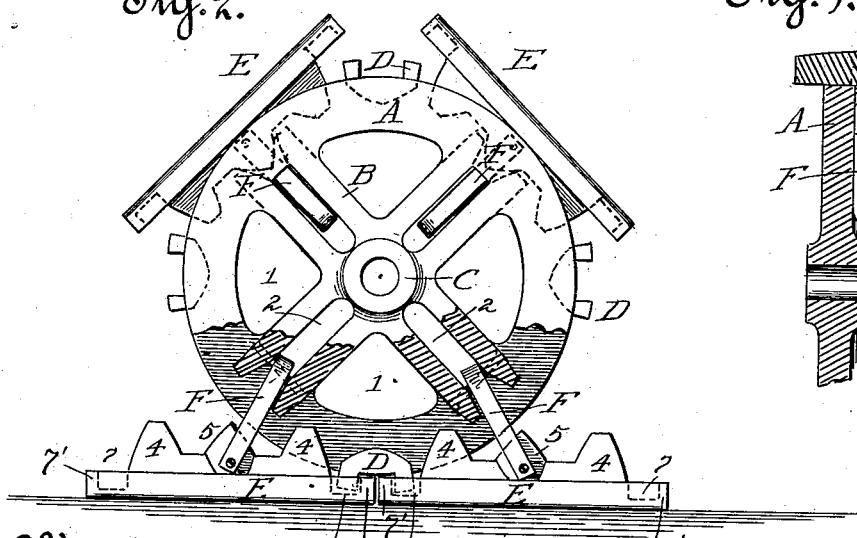
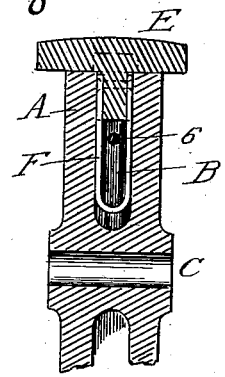
Witnesses. Inventor.
J. E. Monteverdt John W. Livermore
M. R. Seely by Spear & Seely
Attorneys No. 742,462. Patented October 27, 1903.

UNITED STATES PATENT OFFICE.

JOHN W. LIVERMORE, OF BERKELEY, CALIFORNIA.

TRACTION-WHEEL.

SPECIFICATION forming part of Letters Patent No. 742,462, dated October 27, 1903.

Application filed November 25, 1902. Serial No. 132,765. (No model.)

*To all whom it may concern:*

Be it known that I, JOHN W. LIVERMORE, a citizen of the United States, residing at Berkeley, in the county of Alameda and State of California, have invented certain new and useful Improvements in Traction-Wheels, of which the following is a specification.

My invention relates to traction-wheels, and more particularly to the class of wheels which carry and lay the track upon which they run in any direction. Such wheels are adapted for use upon many different kinds of portable machines and vehicles, among which may be mentioned engines, harvesters, threshing-machines, and other agricultural machinery, wagons for hauling freight, cars for removing material in dredging, grading, and excavating, &c.

The object of the invention is to provide a simple, strong, and cheap wheel which will give effective traction on rough or soft or marshy ground, as well as under circumstances in which it has usually been necessary to lay railway-track for trolleys or cars to run upon.

I have embodied my invention in a construction which is fully hereinafter described and have shown it in drawings in connection with which this specification should be read, and in which—

Figure 1 is a vertical longitudinal section of my wheel, its track-shoes being shown in elevation. Fig. 2 is a view, partly in longitudinal section and partly in elevation, showing the wheel in position advanced from that of Fig. 1. Fig. 3 is an end view of Fig. 1. Fig. 4 is a central vertical cross-section through the upper half of the wheel of Fig. 1.

The wheel A is preferably a single casting composed of two circular rims or fellies connected by radial webs B and having a central hollow hub C. This integral construction of the wheel avoids the use of bolts and of making separate castings to be secured by such bolts. I do not, however, wish to limit myself to the integrally-cast wheel, because it is evident that such wheel might be composed of two disks or heads secured together, a modification so obvious to the skilled machinist that I have not considered it necessary to illustrate it. In either case the wheel comprises two parallel disks or rims, preferably open at 1 1 for lightness, separated at the periphery, and connected by the inner radial spokes or webs. These webs are also formed with slots 2 open toward the periphery of the wheel.

The wheel shown in the drawings is intended to carry four track sections or shoes, and that is the number I prefer usually to employ. Consequently the tread of the wheel is formed with four equidistant double teeth D, which project beyond the smooth circular wheel-rims. Alternating with these is another series of double teeth, which are preferably formed by the tapered ends B' of the webs B, but which may be separate teeth, removable if preferred. These teeth D and B' engage with other teeth on the track-sections and by interlocking therewith prevent any slipping.

The track sections or shoes E are plates having a slightly-crowned tread which bears upon the ground and renders it easier to turn. The opposite surface has two plane flat surfaces 3 3, which form the track upon which the circular wheel-treads rest. These surfaces 3 3 are separated by the projecting tapering teeth 4 4 5, having curved edges and formed integrally with each shoe E or attached to them in any suitable way, permanently or removably. These shoes may be suspended from the wheel in any suitable way. The drawings show one practical construction. A link F is pivoted to each tooth 5, the other end of which hangs loosely upon a pin 6, which connects the teeth B' B'. At each end of each shoe is a recess 7 with which the teeth D engage.

Starting from the position of Fig. 1, with the wheel resting upon one shoe, with the teeth B' in gear with the tooth 5 and revolving in the direction of the arrow, the two shoes at the sides are suspended from the pin 6, but a great part of their weight is borne by the interlocking teeth and recesses D and 7. As the wheel revolves the position of Fig. 2 is assumed, the track now being formed by two shoes, end to end, while the engaging gear is composed of a double tooth D and two adjoining recesses 7. Either one or two shoes must always have a bearing on the ground, and in either case the interlocking teeth prevent any slipping while the wheel travels smoothly upon the plane surfaces of the track. The weight of the wheel keeps the teeth in engagement, so that no lost motion ensues during the revolution; but the teeth do not actually interlock unless the wheel commences to slip. It should be noticed also that the links F are so connected to the shoes as to give a very favorable leverage both in lifting the shoe and in letting it down and that this leverage is exerted while the teeth D and recesses 7 are acting as fulcrums, and hence as supports, thus relieving the pins 6 from a great part of the weight of the shoe. It will also be noticed that those track-shoes which are inactive rest upon the upper part of the wheel and are supported thereby and that no separate devices need be provided for supporting the track-sections when not in use. The recesses 7 provide teeth 7' on the shoes.

Having thus fully described my invention, what I claim as new, and desire to secure by Letters Patent, is—

1. A traction-wheel composed of connected parallel disks or rims having smooth circular treads, in combination with straight shoes, having plane surfaces upon which said rims bear, teeth on said shoes between said tracks, and teeth between the wheel-rims, adapted to interlock with the teeth on the shoes, substantially as described.

2. In a traction-wheel, the combination with the wheel having the projecting teeth D a shoe having recesses 7 and a link pivoted to said shoe, and suspended from the interior of the wheel, substantially as described.

3. A traction-wheel having two sets of teeth arranged at different distances from the center and shoes connected with the traction-wheel, said shoes having teeth 7 to engage one set of traction-wheel teeth and having also a second set of teeth for engaging the other set of teeth on the traction-wheel, substantially as described.

4. In a traction-wheel, a disk composed of a hub and two rims cast solid with connecting-webs, but separated for the greater part of their circumference, gear-teeth formed by the outer ends of said webs, and shoes suspended by and pivoted to links projecting through said separated portion; said shoes being provided with interlocking teeth, substantially as described.

5. In a combination with a traction-wheel having two rims with a connecting-web B provided with slots 2, teeth on the traction-wheel, shoes having teeth to mesh with the teeth on the traction-wheel, links F connecting the shoes with the traction-wheel and pins 6 to hold the links, substantially as described.

In testimony whereof I have affixed my signature, in presence of two witnesses, this 6th day of November, 1902.

JOHN W. LIVERMORE.

Witnesses:
L. W. SEELY,
F. M. BURT.